June 26, 1945.　　　C. C. COONS　　　2,379,278
REFRIGERATION
Filed April 24, 1942　　　2 Sheets-Sheet 1

INVENTOR
*Curtis C. Coons*
BY
*Harry S. Dumars*
ATTORNEY

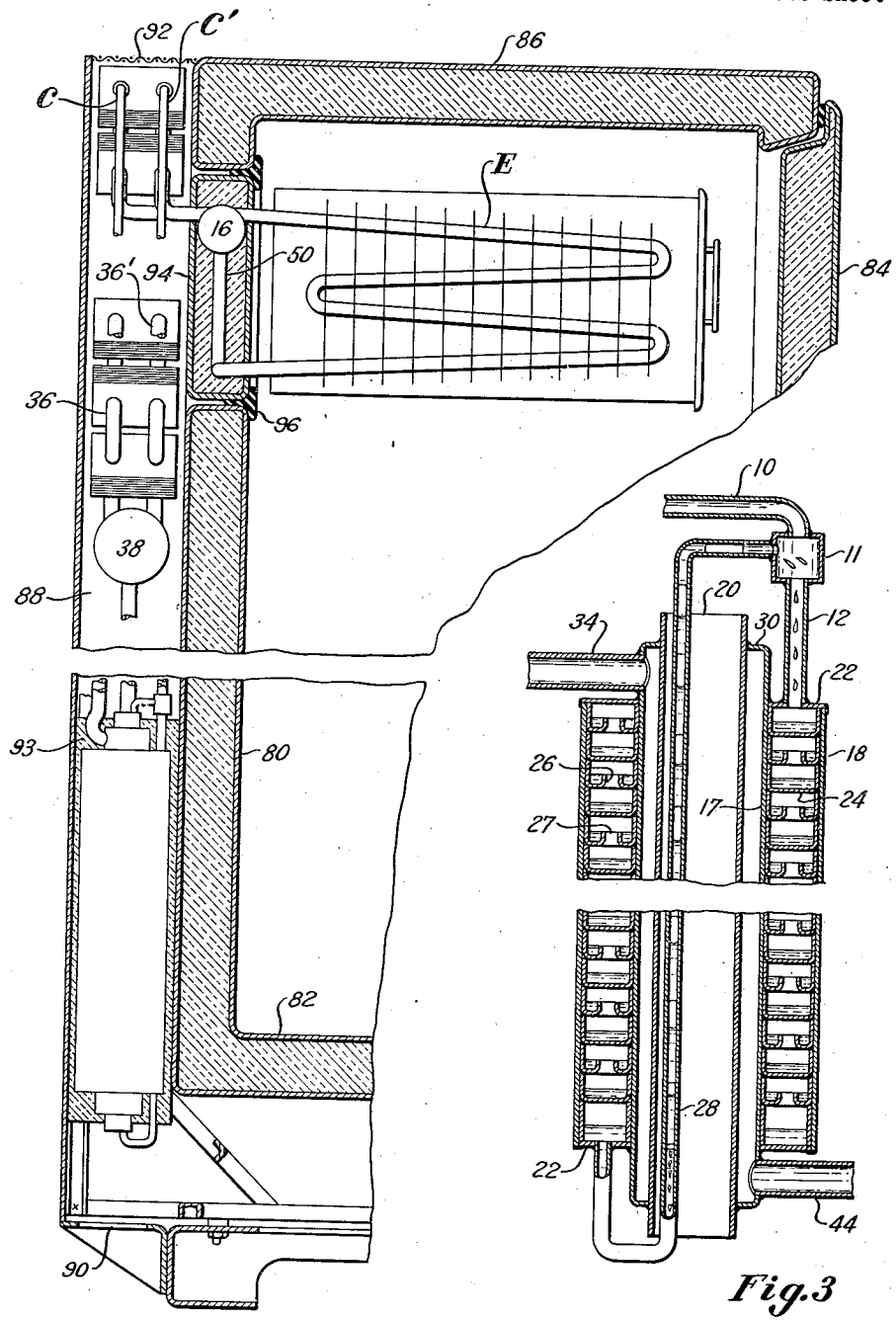

Patented June 26, 1945

2,379,278

UNITED STATES PATENT OFFICE 2,379,278

REFRIGERATION

Curtis C. Coons, North Canton, Ohio, assignor to The Hoover Company, North Canton, Ohio, a corporation of Ohio Application April 24, 1942, Serial No. 440,280

6 Claims. (Cl. 62—118)

This invention relates to refrigeration and more particularly to an intermittent absorption refrigerating apparatus of the type in which the absorption medium for the refrigerant is in liquid form in the generator-absorber under all conditions of operation.

Most known liquid absorbents increase in volume when they absorb the refrigerant vapor. For that reason prior generator-absorbers for intermittent absorption machines have not been provided with pool forming means in the interior of the generator-absorber to increase the contact between the refrigerant vapor and the liquid absorbent.

If pools should be formed, the liquid absorbent in the pools would increase in volume and be spilled from the pools during the absorption period. That has the advantage that the liquid absorbent spilled from the pools would cascade downwardly to the pool below so as to come into intimate contact with refrigerant vapor and increase the absorption efficiency in the generator-absorber.

However, during the next generating period the liquid absorbent remaining in the pools would again decrease in volume as the refrigerant vapor is driven therefrom and eventually all of the pools would become depleted so that there would be no spilling over of the liquid absorbent. This would decrease the amount of liquid available for the absorption of refrigerant vapor as well as terminate the desirable cascading of the liquid absorbent downwardly through the generator-absorber. If some means is not provided for redistributing the liquid absorbent, the liquid absorbent spilled from the pools would collect in the bottom of the generator-absorber and not be available for absorbing refrigerant vapor during the next succeeding absorption period.

A method according to this invention consists in collecting pools of liquid absorbent in the generator-absorber causing the liquid absorbent to absorb refrigerant vapor and increase in volume so that the liquid absorbent in the pools will be spilled therefrom and cascaded downwardly through the generator-absorber into intimate contact with the refrigerant vapor to increase absorption of the vapor, and in automatically redistributing the cascaded liquid absorbent into the pools during the succeeding generating period.

According to this invention a generator-absorber is provided in which pools of liquid absorbent are formed therein and arranged so that when the liquid absorbent increases in volume upon absorbing the refrigerant vapor, some of the liquid in the pools will be thrown from the pools and cascaded downwardly over the next lower pools into intimate contact with the refrigerant vapor so as to increase the efficiency of the generator-absorber during absorption periods.

According to another phase of this invention, means is provided whereby the liquid absorbent in the generator-absorber is automatically redistributed after each absorption period so that the liquid refrigerant spilled from the pools is automatically replaced by the normal operation of the machine.

The specific means provided for the foregoing purpose, circulates the liquid absorption from the bottom of the generator-absorber to the top during the generating period. This results in the liquid absorbent being cascaded downwardly over each succeeding pool in the generator-absorber during the generating period, with the result that rising hot vapor will counterflow with the downwardly cascading liquid absorbent and drive further refrigerant vapor from the absorbent so as to increase the efficiency of the generator-absorber during the generating period as well as during the absorption period.

In order for generator-absorbers of intermittent absorption machines to operate at maximum efficiency during the absorption period very efficient means must be provided for removing the heat of absorption. This is especially true at the beginning of the absorption period since the generator-absorber is very hot and must be cooled quickly before absorption will begin.

The problem is further complicated in air cooled machines because of the fact that some means must be provided for terminating the cooling effect of the air during generating periods. Otherwise, the cooling effect of the air would act in opposition to the heating means during generating periods.

The problem has been solved to some extent by providing a closed vaporization-condensation circuit for cooling the generator-absorber during the absorbing period. In such machines a heat exchange device is placed in heat exchange relationship with the generator-absorber and is connected by conduits to a secondary air-cooled condenser. The indirect cooling circuit is charged with a volatile fluid of such nature that it will be vaporized in the heat exchange device by the heat of absorption. The vapor thus formed flows to the air-cooled secondary condenser where it is condensed and returns to the heat exchange device for further cooling action. Valve or other means may be provided for trapping the liquid cooling medium out of the heat exchange device during generating periods.

The heat exchange device in such an arrangement must be positioned so that the best heat transfer from the absorbent in the generator-absorber to the liquid cooling medium in the heat exchange device will take place. In order to get the best heat exchange possible the heat exchange device is usually in the form of an annular chamber on the interior of the absorbent-receiving chamber and surrounding the heating flue. The entire generator-absorber is embedded in insulation to prevent radiation of heat to the surrounding air during generating periods.

Such an arrangement operates satisfactorily but has the disadvantage that heat from the heating tube must be transferred through the heat exchange chamber during generating periods. Such heat transfer is complicated by the fact that at that time the heat exchange chamber contains only vapor of the cooling fluid which acts as an insulator.

According to the present invention, the liquid absorbent from the generator-absorber is circulated through the heating tube and back into the generator-absorber continuously during generating periods so as to transfer heat from the heating tube to the generator-absorber independently of the heat exchange chamber. This also increases the efficiency of the generator-absorber during the generating period since vaporization of refrigerant vapor from the liquid absorbent takes place as it passes through the heating tube.

Specifically, according to this invention, a vapor lift pump leads from the bottom of the generator-absorber through the heating tube where refrigerant vapor is generated and raises the liquid absorbent to a gas separation chamber by vapor lift action. From the gas separation chamber the liquid absorbent returns to the top of the generator-absorber and the vapor is led to the primary condenser. This arrangement serves to transfer heat from the heating flue to the generator-absorber proper and increases the efficiency of the generator-absorber during the generating period and redistributes the liquid absorbent over the pools in the generator-absorber so as to increase the efficiency of the generator-absorber during the succeeding absorption period.

The generator-absorber according to this invention can be used in machines using water as the absorbent and ammonia as a refrigerant but preferably some absorbent having a negligible vapor pressure and which is in liquid form under operating conditions should be used. Some metallic salts have negligible vapor pressures and are in liquid form when ammonia is absorbed. Examples are lithium nitrate, zinc chloride, and calcium nitrate. Other fluids capable of absorbing refrigerant vapor and having negligible vapor pressures are the ethanolamines. For example, monoethanolamine ($NH_2CH_2OH$) will absorb ammonia and methylamine ($CH_3NH_2$). The use of liquid absorbents having a low vapor pressure makes it unnecessary to use a rectifier for condensing absorbent vapor from the refrigerant vapor on the way to the condenser.

The use of the method and apparatus according to this invention renders it possible to make the apparatus very much smaller and more compact than would otherwise be the case, so that the apparatus can be properly assembled with a domestic refrigerator cabinet.

Other objects and advantages of this invention will become apparent as the description proceeds when taken in connection with the accompanying drawings in which:

Figure 2 shows the apparatus of Figure 1 assembled in proper relationship with a domestic refrigerator cabinet; and Figure 3 is a vertical sectional view of a single generator-absorber according to this invention.

Figure 1:
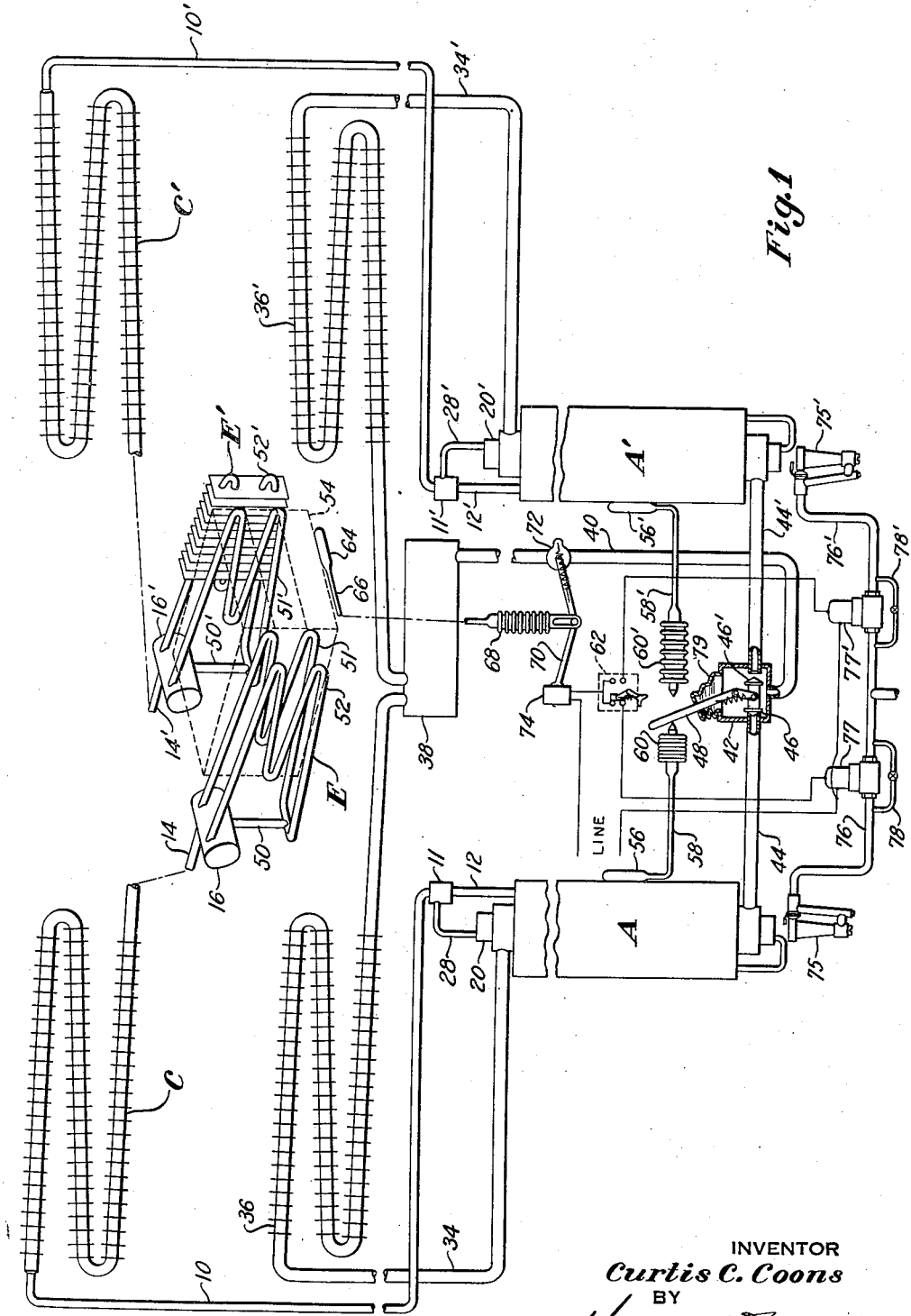
Figure 1 is a diagrammatic representation of a dual intermittent absorption refrigerating apparatus with this invention applied thereto.

According to Figure 1 of the drawings, A, A' represents two generator-absorbers, C, C' two primary condensers, and E, E' two evaporators. The absorbent-receiving chambers of the generator-absorbers A, A' are connected to the condensers C, C' by conduits 10, 10', gas separation chambers 11, 11' and conduits 12, 12'. The operation of the gas separation chambers 11, 11' and conduits 12, 12' will be discussed in more detail hereinafter. The condensers C, C' have a downwardly inclined slope throughout and are connected by conduits 14, 14' to receiving vessels 16, 16' which form a part of the evaporators E, E'.

Each generator-absorber, as shown in Figure 3, comprises an outer cylindrical wall 18, an intermediate cylindrical wall 17 and an inner cylindrical wall 20. The outer cylindrical wall 18 and the intermediate cylindrical wall 17 are connected at the ends by end walls 22 welded thereto, to form an absorbent medium-receiving chamber which is divided into a plurality of small chambers by annular members 24 which are U-shaped in cross section and secured in good heat conducting relationship to the intermediate wall 17. Each of the annular members 24 has an upwardly extending protuberance 26 which forms an opening 27 through the bottom of the member 24 to the next lower chamber. As shown, the protuberance 26 and opening 27 of one member 24 is in staggered relationship to that of the next lower member 24.

The intermediate wall 17 extends above the other annular wall 18 and is bent inwardly at the ends as shown at 30 and welded to the inner cylindrical wall 20 which forms a heating tube for the generator-absorber. The space between the inner wall 20 and the intermediate wall 17 forms a cooling chamber or a heat exchange device of an indirect cooling circuit for each generator-absorber. The entire generator-absorber is enclosed or imbedded in heat insulating material 93, as shown in Figure 2, to reduce heat losses to a minimum.

Extending downwardly from the bottom of the chamber formed by the outer wall 18 and intermediate wall 17, reversely bent, extending upwardly through the heating chamber formed by the inner tube 20 and connected to the gas separation chamber 11, is a tube 28, the function and operation of which will be described more in detail hereinafter.

The upper end of each of the annular heat exchange chambers formed by the intermediate wall 17 and heating tube 20 of the generator-absorbers A, A' are connected by conduits 34, 34' to the upper end of the secondary condensers 36, 36'. The secondary condensers 36, 36' have a continuous downward slope throughout and lead to a reservoir 38. The reservoir 38 is connected by conduit 40 to a valve chamber 42. Valve chamber 42 is connected by conduits 44, 44' to the lower end of the annular heat exchange vessels formed by the intermediate wall 17 and heating tube 20 of each generator-absorber. The valves 46, 46' are designed to be operated by a snap-acting device 48 of any suitable construction.

The evaporators E, E' shown in Figure 1 include conduits 50, 50' extending vertically downwardly from the bottom of the receiving vessels 16, 16'. As shown in Figure 2 these conduits are embedded in insulation for a purpose to be described hereinafter. From the lower end of each of the conduits 50, 50' extend a pair of serpentine conduits 51, 51' and 52, 52' which slope upwardly in a general vertical plane and enter the receiving vessels 16, 16' at points above the point of connection of the conduits 50, 50'. The conduits 51, 51' are in thermal contact with an ice freezing chamber 54, while the conduits 52, 52' have heat exchange fins thereon for box cooling purposes. The operation of the evaporators E, E' will be described more in detail hereinafter. The specific construction of the evaporators E, E' does not form a part of this invention but will form the subject matter of a separate application.

Thermostatic bulbs 56, 56' contact the outer surfaces of generator-absorbers A, A' and are connected by capillary tubes 58, 58' to bellows 60, 60' which upon expansion and contraction are adapted to operate the snap-acting device 48. The bulbs 56, 56', tubes 58, 58', and bellows 60, 60' are charged with a suitable vaporizable fluid so that the bellows 60, 60' will expand and contract upon variations in temperature of the bulbs 56, 56' as is well known in the art. A snap-acting switch 62 of any well known construction is positioned to be actuated by the snap-acting device 48.

A thermostatic bulb 64 is positioned in contact with the ice freezing vessel 54 and is responsive to the temperature of that vessel. Bulb 64 is connected by capillary tube 66 to a bellows 68. Bulb 64, tube 66, and bellows 68 are charged with a suitable vaporizable fluid so that the bellows 68 will expand and contract upon variations in temperature of the ice-freezing chamber 54 as is well known in the art. Bellows 68, upon expansion and contraction, is adapted to actuate a snap-acting device 70 which in turn operates the valve 72 in the conduit 40 and an electric switch 74.

The heating tubes 20, 20' of the generator-absorbers A, A' are heated by burners 75, 75' supplied with a combustible fuel by conduits 76, 76' which includes magnetic valves 77, 77'. Conduits 78, 78' by-pass the valves 77, 77' and have regulating valves therein to supply a minimum or pilot flame to the burners 75, 75'.

One side of the power line is connected to one side of the switch 74. The other side of the switch 74 is connected by suitable conductors as shown to two of the contacts of the switch 62. The other two contacts of the switch 62 are connected by suitable conductors to one side of the electrical circuits of the magnetic valves 77, 77', the other sides of which are connected to the other side of the power line.

The indirect cooling circuits for the generator-absorbers A, A' which are formed by the heat exchange vessels between the walls 17 and 20 of each generator-absorber, conduits 34, 34' secondary condensers 36, 36', storage vessel 38, conduit 40, valve chamber 42, and conduits 44, 44' are suitably charged with a vaporizable liquid such as methyl chloride. The pressure within the indirect cooling circuit is not high and as a consequence the snap-acting device 48 may be led to the interior of the valve chamber 42 through a suitable flexible joint 79.

The refrigerating apparatus just described and shown diagrammatically in Figure 1 is adapted to be arranged so as to be mounted in a domestic refrigerator cabinet as shown in Figure 2. The cabinet comprises a back insulated wall 80, lower insulated wall 82, front access door 84 and top insulated wall 86. At the rear of the cabinet is provided a flue 88 for the circulation of air over the heat rejecting parts in the apparatus. An opening 90 at the bottom of the flue 88 provides for the entrance of cooling air and a screen 92 at its top provides for its exit. The generator-absorbers A, A' are embedded in insulation 93 and are positioned at the sides of the flue 88 so as not to interfere with the air circulation. The primary condensers C, C' extend across the flue 88 near its upper end slightly above the evaporators E, E', and the secondary condensers 36, 36' are similarly arranged below the primary condensers.

The collecting vessels 16, 16' and the conduits 50, 50' of the evaporators E, E' are embedded in an insulating enclosure 94 for an opening in the back of the cabinet through which opening the evaporators are adapted to pass when the apparatus is assembled with the cabinet. An insulating gasket 96 is provided to seal the space between the closure 94 and the opening in the back of the cabinet.

As shown in Figure 1, the valve 72 is open and the switch 74 is closed. The switch 62 is set so that the magnetic valve 77 will be open and fuel will be supplied to the burner 75 for maximum flame operation so that the generator-absorber A will be heated. The bulb 60 is contracted and the bulb 60' is expanded by previous heating of the generator-absorber A' as will be described hereinafter. Thus the snap-acting device will be positioned to the left, the valve 46 will be closed and the valve 46' open.

With the control set as in Figure 1, the heating of the generator-absorber A will form refrigerant vapor bubbles in the conduit 28 extending upwardly through the flue 20. The bubbles so formed will raise liquid absorbent upwardly along with the bubbles in the conduit 28 into the gas separation chamber 11. The liquid absorbent will be separated from the vapor and flow downwardly through conduit 12 into the top of the absorbent receiving chamber of the generator-absorber A. In the absorbent-receiving chamber of the generator-absorber A, liquid absorbent will fall upon the first of the members 24 and overflow onto the next lower member 24 through the openings 27. The liquid absorbent will similarly cascade downwardly over each following member 24 until it reaches the bottom of the generator-absorber. In cascading downwardly through the generator-absorber, the hot liquid absorbent will heat the liquid in the pools formed by the members 24 and drive refrigerant vapor therefrom. At the same time the hot vapor rising upwardly through the generator-absorber will contact the liquid absorbent flowing downwardly therethrough and drive additional refrigerant vapor therefrom. Heat will also be transferred from the heating tube 20 by radiation to the liquid absorbent in the absorbent-receiving chamber and drive additional refrigerant vapor from the liquid absorbent lying in the pockets formed by the members 24.

The refrigerant vapor driven from the liquid absorbent in the generator-absorber will leave the generator-absorber by conduit 12. The conduit 12 is made of sufficiently large diameter that the rising vapors will not carry the liquid absorbent flowing downwardly through the conduit 12 along therewith by vapor lift action. The vapor generated in the absorbent-receiving chamber will then join that generated in the conduit 28 in the gas separation chamber 11. From the gas separation chamber 11, both portions of the vapor will flow through conduit 10 to the top of the condenser C where it will condense and the heat of condensation will be carried away by air flowing over the heat rejecting fins mounted upon the tubes of the condenser. The liquid refrigerant condensed in the condenser C will flow through conduit 14, by gravity, to the collecting vessel 16.

During the heating of the generator-absorber A, the auxiliary cooling liquid in the annular heat exchange chamber formed by the walls 17 and 20 of the generator-absorber A will quickly vaporize and flow by conduit 34 into the secondary condenser 36. The air flowing over the fins of the condenser 36 will carry away the heat of condensation of the auxiliary fluid whereby it will condense and flow downwardly through the tubes of the condenser 36 into the reservoir 38. This liquid auxiliary cooling fluid cannot return to the generator-absorber A at this time because the valve 46 is closed. Thus the chamber between the heating tube 20 of the generator-absorber A and its absorbent-receiving chamber will contain only vapor of the auxiliary cooling medium and act as an insulator for direct heat transfer from the heating tube 20 to the absorbent in the absorbent-receiving chamber. However, some heat will be transferred, to the absorbent-receiving chamber, by radiation from the heating tube 20 and the remainder by the hot liquid absorbent heated in tube 28 as previously described.

In the meantime absorption of refrigerant vapor is taking place in the generator-absorber A' in a manner which will be described in connection with the absorption which takes place in the generator-absorber A when the control operates to shift the generator-absorber A from the generating phase to the absorption phase and the generator-absorber A' from the absorption phase to the generating phase.

When the refrigerant is driven from the absorbent in the generator-absorber A, the heat from the heating tube 20 will no longer be utilized in driving refrigerant vapor from the absorbent in the generator-absorber A and it will rise in temperature. This rise in temperature will be quite abrupt even though the heat supplied to the generator-absorber A remains constant. This comes about by reason of the fact that while refrigerant is being driven from the absorbent, the heat supplied thereto is being utilized to vaporize the refrigerant and when the refrigerant is vaporized, the heat supplied quickly raises the temperature of the generator-absorber to a much higher value.

This will cause the liquid in the bulb 56 to vaporize whereby the bellows 60 will be expanded. At this time the bellows 60' will be in contracted position because absorption is taking place in the generator-absorber A' and the fluid in the bulb 56' will be condensed. Expansion of the bellows 60 will push the snap acting device 48 to the right which will operate switch 62 to de-energize the magnetic valve 77 and to energize the magnetic valve 77' so as to supply a maximum flame to the heating tube 20' of the generator-absorber A'. At the same time it will operate to open the valve 46 and to close the valve 46'.

The indirect cooling system is charged with sufficient auxiliary cooling medium that the reservoir 38 will always contain auxiliary cooling medium in liquid form. When the control operates to open the valve 46, the liquid in the reservoir 38 will be dumped into the annular heat exchange chamber formed by the walls 17 and 20 of the generator-absorber A. Since the generator-absorber A is hot at this time, the auxiliary cooling liquid will be quickly vaporized by the transfer of heat of vaporization of the auxiliary liquid from the generator-absorber A and it will thus be quickly cooled. The cooling of the generator-absorber A will reduce the vapor pressure therein and the liquid absorbent therein will begin to absorb refrigerant vapor and vaporization of the liquid refrigerant in the evaporator E will begin.

Refrigerant vapor evaporating in the evaporator E will return to the generator-absorber A by conduit 14, primary condenser C, conduit 10, gas separation chamber 11 and conduit 12.

As absorption proceeds in the generator-absorber A, the heat of absorption is transferred to the auxiliary cooling liquid in the annular heat exchange chamber formed by the walls 17 and 20 of the generator-absorber A. This vaporizes the auxiliary liquid and the vapor thus formed flows to the condenser 36 by conduit 34. Here the vapor is condensed and the heat of condensation carried away by air flowing over the heat rejecting fins of the condenser 36. The tubes of the condenser 36 have a continuous downward slope and the liquid auxiliary cooling fluid returns to the reservoir 38 to be returned in due course to the annular heat exchange chamber of the generator-absorber A for further cooling action.

As the liquid absorbent lying in the pools formed by the elements 24 absorbs the refrigerant vapor, the liquid absorbent will increase in volume and overflow the edges of the protuberances 26 and flow through the openings 27 to the pool formed by the next lower element 24. In so doing the cascading liquid absorbent will come into intimate contact with refrigerant vapor and accelerate the absorption of the refrigerant vapor by the liquid absorbent. The cascading liquid absorbent will eventually collect in the bottom of the absorbent-receiving chamber of the generator-absorber A and in the U-bend of the conduit 28 until the succeeding generating phase for the generator-absorber A.

The refrigerant which is evaporating in the evaporator E at this time will cool the conduits 51 and 52 which will in turn cool the ice freezing chamber 54 and freeze the contents thereof as well as cool the air in the refrigerator compartment or food storage space. Since the conduit 50 is insulated no evaporation will take place therein. The conduit 51 being in contact with the freezing chamber 54 and the conduit 52 being in heat exchange with the air in the food storage compartment, a comparatively rapid evaporation of liquid refrigerant will take place therein. This will cause the liquid in the conduits 51 and 52 to be raised upwardly so that a positive circulation of the liquid refrigerant will take place and increase the transfer of heat to the liquid refrigerant in the evaporator E.

A sufficient charge of refrigerant is charged into the apparatus so that liquid refrigerant will remain in the conduits 50, 51 and 52 at the end of the evaporation phase so that the local circulation of liquid refrigerant through the coils 51 and 52 of the evaporator will be assured during the evaporation phase of the evaporator E.

The fact that the liquid refrigerant flowing downwardly through the conduit 50 divides into two portions, one going to conduit 51 and the other to conduit 52, renders it possible to regulate the rate of heat transfer to each coil automatically depending upon the load thereon. For instance, if warm water had just been placed in the freezing chamber 54 a rapid ebullition of refrigerant vapor will take place in the conduit 51 with the result that a rapid circulation of refrigerant will take place through the coil 51 far in excess of that taking place in the coil 52.

If the efficiency of the heat transfer path between the coil 52 and the circulating air is the same as that between the freezing chamber 54 and the coil 51, the ultimate lower temperatures will be the same in each coil. This will tend to form frost on the coil 52 since the ice freezing chamber 54 must be brought below the freezing temperature of water. This frost will be melted when the generator-absorber A is switched over to the next succeeding generating phase.

However, by regulating the rate, or capacity of heat transfer from the air to the coil 52, the temperature of the coil 51 can be brought to a much lower temperature than that of the coil 52. For example, if the coil 52 is slightly insulated, the fins are omitted or the rate of air circulation thereover is controlled, the coil 51 can be dropped to a sufficiently low temperature to freeze ice in the chamber 54 while the coil 52 is maintained above the freezing point of water.

By the time that the generator-absorber A has absorbed all the refrigerant vapor which the liquid absorbent therein is capable of absorbing, the refrigerant vapor will be driven from the liquid absorbent in the generator-absorber A'. This will cause the medium in the bulb 56' to expand the bellows 60' in the manner previously described in connection with the generator-absorber A. Snap acting device 48 will move to the left as viewed in Figure 1, whereby the valve 46 will be closed, the valve 46' opened and switch 62 operated to energize the magnetic valve 77 and de-energize the magnetic valve 77'. This will cause the heat supplied to the generator-absorber A' to be cut off and supply heat to the generator-absorber A which will cause vaporization to take place in the generator-absorber A and absorption in the generator-absorber A' which will proceed as previously described.

Ice in the ice freezing chamber 54 will act as a cold hold-over device and will cooperate with evaporation taking place in one evaporator, while hot refrigerant is being supplied to the other, to hold the temperature in the food storage space substantially constant.

The control will function to operate alternately the generator-absorbers A, A' on the generating phase and on the absorption phase as just described until the temperature of the ice freezing chamber 54 goes below a predetermined limit which is substantially below the temperature of the air in the food storage compartment. At that time the bulb 64 will operate to collapse the bellows 66 and operate to close the valve 72 and open the switch 74. This will operate to de-energize that generator-absorber which is then being energized and to stop the flow of cooling fluid in the indirect cooling circuit of the generator-absorber then being cooled.

Liquid cooling medium in the annular heat exchange chamber of the generator-absorber which has been operating on the absorption cycle will soon vaporize due to the heat of absorption and will pass through the secondary condenser where it will be condensed. The tubes of the secondary condenser slope downwardly toward the reservoir 39 and this condensed liquid cannot return to the cooling space of the generator-absorber being cooled, but will flow to the reservoir 39 to be trapped out of circuit by the closed valve 72. When the absorption of the refrigerant vapor in the generator-absorber being cooled ceases, no more liquid refrigerant will evaporate in the evaporator of that unit. Thereafter the temperature of the air in the food storage compartment and consequently the temperature of the freezing chamber 54 will slowly rise until the control bulb 68 again acts to open the valve 72 and close the switch 74. The two units will then operate cyclically as previously described.

As will be seen from the foregoing, this invention provides the method and apparatus in which the liquid absorbent in the generator-absorber is caused to cascade downwardly through the generator-absorber during absorption periods to increase the absorption of the refrigerant vapor by the liquid absorbent and in which the liquid absorbent is automatically redistributed during generating periods.

This invention also provides a method and apparatus whereby the generator-absorbers are efficiently cooled during absorption periods and efficiently heated during generating periods by circulation of the liquid absorbent through the heating chamber and back to the generator-absorber during generating periods while at the same time a partial heating of the liquid absorbent in the generator-absorber is produced by radiation from the heating source to the liquid absorbent in the generator-absorbers.

While I have shown but a single modification of my invention it is to be understood that it is to be taken as illustrative only and not in a limiting sense. I do not wish to be limited to the particular structure shown and described but to include all equivalent variations thereof except as limited by the scope of the claims.

I claim:

1. The method of operating a generator-absorber for an intermittent absorption refrigerating apparatus comprising, providing pools of liquid absorbent in the generator-absorber, cooling the pools of liquid absorbent while in contact with refrigerator vapor so that the liquid absorbent in the pools will absorb refrigerant vapor and increase in volume, and utilizing the increase in volume to cascade said absorbent downwardly through the generator-absorber throughout the entire cooling period into contact with refrigerant vapor to increase the absorption of refrigerant vapor.

2. The method of operating a generator-absorber for an intermittent absorption refrigerating apparatus comprising, providing pools of liquid absorbent in the generator-absorber, cooling the pools of liquid absorbent while in contact with refrigerant vapor so that the liquid absorbent in the pools will absorb refrigerant vapor and increase in volume, utilizing the increase in volume to cascade said absorbent downwardly through the generator-absorber during the entire cooling period into contact with refrigerant vapor to increase the absorption of refrigerant vapor, terminating the cooling of the liquid pools, heating the cascaded liquid absorbent to redistribute it to the liquid pools and heat the liquid absorbent therein while heating the liquid absorbent in the pools by radiation from the heating source.

3. The method of heating a generator of an absorption refrigerating machine containing a liquid absorbent in which a heat exchange device of an indirect cooling circuit lies between the absorbent-receiving chamber and the heating source comprising, heating the liquid absorbent at the heating source to circulate the liquid absorbent from the absorbent-receiving chamber through the heating source and back to the absorbent-receiving chamber to transfer heat from the heating source to the liquid absorbent in the absorbent-receiving chamber and transferring heat from the heating source to the liquid absorbent in the absorbent-receiving chamber by radiation through the heat exchange device.

4. The method of heating and cooling a generator-absorber of an intermittent absorption refrigerating apparatus of the type containing a liquid absorbent and which is cooled by a closed vaporization-condensation circuit, the vaporizer of which lies between the absorbent-receiving chamber and the heating source comprising, maintaining a cooling fluid in liquid form in the vaporizer during the absorption period to take up the heat of absorption by vaporization of the cooling liquid, removing the liquid cooling fluid from the vaporizer of the cooling circuit during the generating period, circulating the liquid absorbent from the absorbent-receiving chamber and back to the absorbent-receiving chamber by the application of heat at the heating source to heat liquid absorbent in the absorbent-receiving chamber and transferring heat from the heating source to the liquid absorbent in the absorbent-receiving chamber through the vaporizer of the cooling circuit by radiation.

5. A generator-absorber for an absorption refrigerating apparatus of the type in which the absorbent for the refrigerant is in liquid form during operation comprising, a vessel having a central heating tube, a heat exchange chamber surrounding said tube, an absorbent-receiving chamber surrounding said heat exchange chamber and means for circulating absorbent from the absorbent-receiving chamber through the heating tube and back to the absorbent-receiving chamber whereby the heat transfer from the heating tube to the absorbent in the absorbent-receiving chamber is facilitated.

6. An intermittent absorption refrigerating apparatus comprising, a generator-absorber, an indirect vaporization-condensation cooling circuit for said generator-absorber, heating means for said generator-absorber, said cooling circuit including a heat exchange device for taking up heat directly from said generator-absorber during the absorption period and positioned between said generator-absorber and said heating means and means for transferring heat from said heating means to said generator-absorber independently of said heat exchange device.

CURTIS C. COONS.